April 30, 1957    W. O. SHEETS    2,790,670
WEED CUTTING AND EXTRACTING TOOL
Filed Feb. 18, 1954

*INVENTOR.*
WILLIAM O. SHEETS
BY
*ATTORNEY*

United States Patent Office

2,790,670
Patented Apr. 30, 1957

2,790,670

WEED CUTTING AND EXTRACTING TOOL

William O. Sheets, Spearman, Tex.

Application February 18, 1954, Serial No. 411,116

3 Claims. (Cl. 294—50.9)

My invention relates to a weed cutter and extractor.

A primary object of the invention is to provide a simplified device of the above-mentioned character for use on the lawn and in gardens for cutting and pulling weeds such as dandelions and the like.

A further object is to provide in a tool of the above-mentioned character means for severing the main roots of the weeds and gripping means cooperating with the severing means for extracting the severed weed from the ground.

A further object is to provide a weed cutter and extractor which will pull the upper portion or foilage of the weed from heavy tough grass, such as crab grass, after the roots are cut.

Still another object is to provide in a tool of the above-mentioned character a spring closed gripping jaw providing a pocket for the weed foilage and teeth which will aid in extracting the weed from the ground, the jaw being operated by means arranged near the upper end of the tool handle.

Other objects and advantages of the invention will be apparent during the course of the following description.

Figure 2:
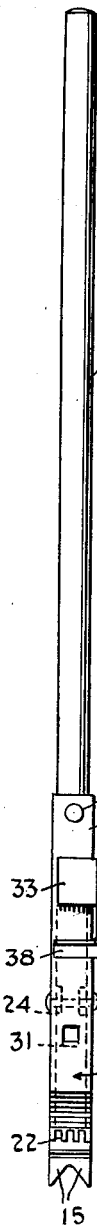
Figure 1:
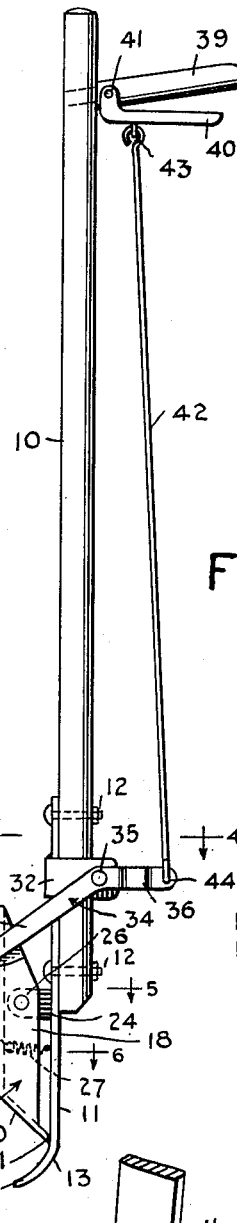
Figure 3:
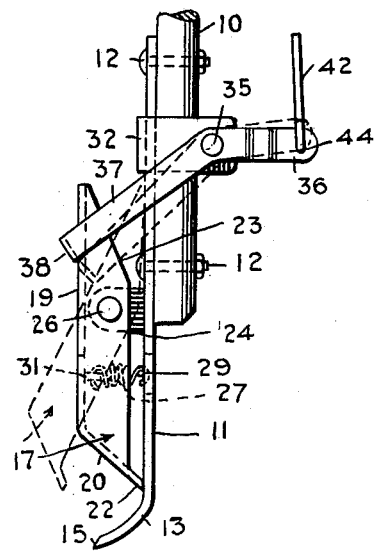
Figure 4:
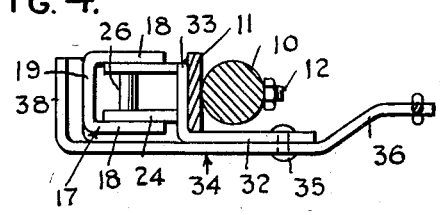
Figure 5:
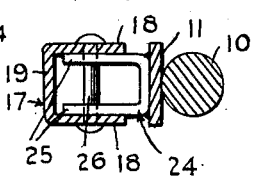
Figure 6:
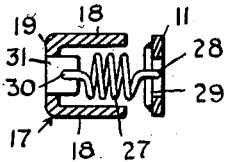
Figure 7:
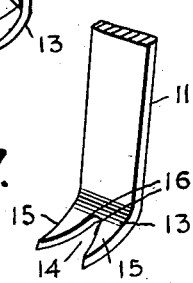
Figure 8:
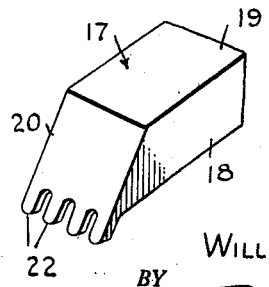

In the accompanying drawings, forming a part of this application, and in which like numerals are employed to designate like parts throughout the same, Figure 1 is a side elevation of a weed severing and extracting tool embodying by invention, Figure 2 is a front elevation of the same, Figure 3 is an enlarged fragmentary side elevation of the lower end portion of the tool showing the opened position of the weed gripping jaw in broken lines, Figure 4 is an enlarged horizontal transverse section taken on line 4—4 of Figure 1, Figure 5 is a similar section taken on line 5—5 of Figure 1, Figure 6 is a similar section taken on line 6—6 of Figure 1, Figure 7 is an enlarged fragmentary perspective view of a weed cutting or severing blade, and, Figure 8 is a similar perspective view of the weed gripping jaw.

In the drawings, where for the purpose of illustration is shown a preferred embodiment of my invention, the numeral 10 designates an elongated straight handle of any convenient length, and formed of wood or the like. A generally flat elongated weed cutting or severing blade 11 is arranged adjacent to the lower end portion of the handle 10 and rigidly secured to the forward side of the handle by a pair of spaced bolts 12, or the like, as shown. The blade 11 extends for a considerable distance below the lower end of the handle 10 and longitudinally thereof, and has its lower end portion 13 forwardly directed and inclined downwardly, as indicated. The lower end portion 13 of the blade 11 is provided with a generally V-shaped cutting notch 14 forming a pair of spaced tapering cutting teeth 15, as shown, the inner opposed sides 16 of which are preferably bevelled and sharpened to form knifelike edges for severing the roots of the weeds. The blade 11 is relatively rigid and quite strong, so that it may be inserted into the soil for severing the roots of weeds.

A gripping jaw 17 is arranged adjacent the forward side of the blade 11 and extends parallel thereto and spaced slightly therefrom, as shown in the drawings. The jaw 17 is substantially U-shaped in transverse cross section, and includes spaced sides or webs 18 and a forward side or wall 19, parallel to the blade 11 and arranged at right angles to the sides 18. The inner side of the gripping jaw 17 facing the blade 11 is open, as is the upper end of the gripping jaw, so that the gripping jaw forms a pocket or enclosure with the blade 11 for the foilage of the weed to be severed and extracted from the ground. The gripping jaw 17 further comprises a lower end wall 20, integral therewith, and inclined with respect to the blade 11 and forward wall 19, as shown. The end wall 20 is spaced above the inclined end portion 13 of the cutter blade, and forms generally a right angle therewith when the gripping jaw 17 is in the closed position, parallel to the blade 11. The lowermost end portion of the end wall 20 projects inwardly of the open side of the U-shaped jaw 17, for contact with the blade 11, as at 21. This portion of the end wall 20 is serrated or toothed as indicated at 22, to facilitate gripping the weed and extracting the same from heavy tough grass and the like. The upper end of the gripping jaw 17 is bevelled or inclined at 23 to allow the upper end of the jaw to swing toward the blade 11 when the gripping jaw is opened, as shown in broken lines in Figure 3.

A U-shaped mounting bracket 24 is rigidly secured by welding or the like, to the forward side of the blade 11, substantially midway of its length. The sides 25 of bracket 24 engage between the sides 18 of the jaw 17, near and below the inclined end 23 of the jaw. The jaw 17 is pivoted to the mounting bracket 24 by a rivet 26, or the like, extending through aligned apertures in the sides 18 and 25, as shown.

Somewhat below the bracket 24, a retractile coil spring 27 is arranged between the jaw 17 and blade 11, and extends inside of the U-shaped jaw, as indicated. The spring 27 is arranged at right angles to the blade 11, and has its rear end 28 secured to a pin 29, or the like, rigidly secured by welding or the like to the blade 11. The forward end 30 of the spring 27 is secured to an apertured lug 31, struck rearwardly from the front wall 19 of the pivoted jaw 17. The spring 27 is quite strong, and serves to normally hold the pivoted jaw 17 in the closed or gripping position shown in full lines, Figure 3, wherein the teeth 22 bear against the forward side of the blade 11.

Means are provided to swing the jaw 17 to the open or dotted line position, Figure 3. Such means comprises an L-shaped mounting bracket 32, including a forward extension 33, rigidly secured by welding or the like to the forward face of the blade 11, above the jaw 17. The bracket 32 extends transversely adjacent to one side of the handle 10, Figure 4, and somewhat rearwardly of the handle. The bracket 32 is substantially rigid. A jaw operating crank or lever 34 is pivoted at 35 to the L-shaped bracket 32, and has a rear horizontal extension or arm 36 extending rearwardly thereof. A forward inclined portion or arm 37 of the crank 34 extends forwardly of the handle 10 and blade 11, and downwardly across the upper inclined end portion 23 of the jaw 17, near one side wall 18 thereof. The arm 37 carries a forward transverse extension or bar 38, integral therewith, and arranged at right angles thereto, and this bar 38 extends transversely across the forward wall 19 of the jaw 17, for sliding contact therewith.

The handle 10 is provided near its top end with a rearwardly projecting cane-like handle 39, rigidly secured thereto, and a pivoted gripping handle or lever 40 is arranged directly beneath the handle 39, with its forward end pivoted thereto at 41. A longitudinal connecting rod or wire 42 extends generally parallel to the handle 10 and spaced from the rear side of the same, and has its upper end pivotally secured at 43 to the pivoted handle 40, and its lower end pivoted at 44 to the rear end of the arm 36. When the pivoted handle 40 is drawn upwardly or gripped against the handle 39, the crank 34 swings counterclockwise, Figure 3, to the dotted line position, for opening the pivoted jaw 17. The spring 27 automatically closes the jaw 17 when the handle 40 is released and returns the crank 34 to its normal full line position shown in Figure 3.

In operation, the pivoted handle 40 is gripped against the fixed handle 39 for swinging the jaw 17 to the opened position, shown in dotted lines in Figure 3. The blade 11 is inserted into the soil adjacent to the weed to be cut and extracted, and the lower inclined portion 13 of the blade 11 passes underneath the foliage of the weed so that the main root of the weed can enter the notch 14 and be severed by the teeth 15. When this has been done, the handle 40 is released, and the spring 27 closes the pivoted jaw 17 which will now grip the foliage of the weed and clamp the same tightly against the blade 11. Since the jaw 17 is hollow or U-shaped in cross-section, a pocket is provided for some of the weed foliage, and a substantial part of the weed will be held by the jaw 17. The teeth 22 of the jaw will engage the weed foliage to aid in extracting the weed from compact soil, tough grass, such as crab grass and the like. The weed is now lifted from the soil, and the jaw 17 is again opened by the operator for releasing the weed and dropping it into a suitable receptacle.

It is thus seen that my tool is adapted to sever the roots of weeds beneath the soil, and lift or extract the severed weed from the soil. The jaw 17 is held normally closed by the spring 27, but may be opened at the will of the operator by means of the pivoted handle 40. The tool is simplified and sturdy in construction, reliable and efficient in operation, and relatively inexpensive to manufacture. It should serve as a handy appliance for lawn keepers, gardeners and the like.

It is to be understood that the form of my invention, herewith shown and described is to be taken as a preferred example of the same, and that various changes in the shape, size and arrangement of parts may be resorted to, without departing from the spirit of the invention or scope of the subjoined claims.

Having thus described my invention, I claim:

1. A weed cutting and extracting tool comprising a handle, a substantially flat cutting blade secured to one end of the handle and having a laterally projecting lower end portion provided with a cutting notch to engage and sever the root of the weed, a gripping jaw arranged in opposition to said blade above said notch and pivotally secured thereto and being substantially U-shaped in cross section and having an open side arranged next to the cutting blade and forming therewith a pocket for the foliage of the weed, an end wall for the lower end of the gripping jaw and having teeth engageable with the cutting blade above said laterally projecting lower end portion, a spring connecting the gripping jaw and cutting blade and serving to hold said teeth normally in gripping engagement with the cutting blade, a crank pivoted to said handle and having a part slidably engaging said gripping jaw to swing the same to an open position wherein the teeth are out of engagement with the cutting blade, and means carried by said handle and arranged exteriorly of the handle and connected with the crank for swinging the crank in a direction causing the gripping jaw to swing to its open position.

2. A weed cutting and extracting tool comprising a handle, an elongated cutting blade secured to the handle near its lower end and having an inclined bifurcated bottom extension projecting forwardly of the blade and handle and adapted to sever the roots of the weed, an elongated gripping jaw arranged opposite the forward side of the cutting blade and substantially parallel thereto and being substantially U-shaped in cross section and having an open side arranged next to the cutting blade, means forming a pivotal connection between the cutting blade and gripping jaw between the upper and lower ends of the gripping jaw, a retractile spring connecting the gripping jaw and cutting blade below said means and serving to maintain the gripping jaw in gripping engagement with the cutting blade, an inclined lower end wall for the gripping jaw having teeth to engage the cutting blade above said bifurcated extension of the cutting blade and arranged generally at right angles to the bifurcated extension, a crank pivoted to said handle and having a part slidably contacting the gripping jaw above said means and swingable in a direction forcing the gripping jaw into an open position with respect to the cutting blade, a pivoted element arranged exteriorly of and carried by said handle near its upper end, and a connecting element arranged exteriorly of the handle and disposed between said pivoted element and crank so that movement of the pivoted element in one direction will effect the opening of said gripping jaw.

3. A weed cutting and extracting tool comprising a handle, an elongated substantially flat blade secured to the lower end of the handle and projecting beyond the same and including a lateral extension extending outwardly from the handle, said lateral extension having a fork provided with a cutting edge, an elongated gripping jaw arranged outwardly of and opposite the cutting blade, said jaw being U-shaped in cross section and having an open side arranged next to the blade, a braket secured to the blade above said lateral extension and passing into said jaw through its open face, a pivot element connecting the gripping jaw and said bracket, said gripping jaw having a lower inclined end provided with spaced teeth which project beyond the inner side of said jaw, said inclined end and teeth being arranged generally at a right angle to the lateral extension, a spring arranged within said jaw beneath said pivot of the jaw and connecting the jaw and blade and serving to bias the inclined end and teeth toward the lateral extension, a bell crank arranged exteriorly of the handle near said jaw and pivoted to the handle and having a part slidably engaging the jaw above the pivot, and means arranged exteriorly of the handle and extending near the upper end of the handle and connected with the bell crank to swing the same.

References Cited in the file of this patent
UNITED STATES PATENTS

| | | |
|---|---|---|
| 1,024,500 | Dahl | Apr. 30, 1912 |
| 1,245,924 | Johnson | Nov. 6, 1917 |
| 2,196,116 | Johnson | Apr. 2, 1940 |

FOREIGN PATENTS

| | | |
|---|---|---|
| 615,014 | Great Britain | Dec. 31, 1948 |